United States Patent [19]

Träubel et al.

[11] Patent Number: 5,770,651
[45] Date of Patent: Jun. 23, 1998

[54] USE OF OLIGOURETHANES AS FORMULATING AGENTS FOR AQUEOUS PIGMENT PREPARATIONS

[75] Inventors: Harro Träubel, Leverkusen; Hans-Werner Müller, Köln; Fritz Novotny, Bergisch Gladbach, all of Germany

[73] Assignee: Bayer Aktiengesellschaft, Leverkusen, Germany

[21] Appl. No.: 136,439

[22] Filed: Oct. 13, 1993

Related U.S. Application Data

[63] Continuation-in-part of Ser. No. 865,429, Apr. 9, 1992, abandoned.

[30] Foreign Application Priority Data

Apr. 16, 1991 [DE] Germany .................... 41 12 327.1

[51] Int. Cl.⁶ ................. C08J 3/00; C08K 3/20; C08L 75/00
[52] U.S. Cl. ................ 524/591; 524/839; 524/840
[58] Field of Search .................... 524/591, 839, 524/840

[56] References Cited

U.S. PATENT DOCUMENTS

| | | | |
|---|---|---|---|
| 4,147,679 | 4/1979 | Scriven et al. | 524/839 |
| 4,507,427 | 3/1985 | Potter et al. | 524/591 |
| 4,510,302 | 4/1985 | Kolb et al. | 526/264 |
| 4,812,492 | 3/1989 | Eckes et al. | 523/351 |

FOREIGN PATENT DOCUMENTS

| | | |
|---|---|---|
| 2015824 | 3/1990 | Canada . |
| 0341053 | 11/1989 | European Pat. Off. . |

*Primary Examiner*—Patrick D. Niland
*Attorney, Agent, or Firm*—Joseph C. Gil; Richard E. L. Henderson

[57] ABSTRACT

Oligourethanes containing both anionic and cationic groups may be used as formulating agents for superior aqueous pigment preparations.

6 Claims, No Drawings

USE OF OLIGOURETHANES AS FORMULATING AGENTS FOR AQUEOUS PIGMENT PREPARATIONS

This application is a continuation-in-part application of parent application Ser. No. 865,429, filed Apr. 9, 1992, abandoned.

This invention relates to the use of certain oligourethanes as formulating agents for aqueous pigment preparations. The terms "pigments" and "pigment preparations" in the context of this invention include matting agents and their preparations. The new preparations obtainable by means of the oligourethanes to be used according to the invention are eminently suitable for the pigmentation (or matting) of dressing agents for leather and leather imitations and of textile coating compounds. "Formulating agents" within the meaning of this invention are the binders of the pigment preparations, but not necessarily also the complete binders of the dressing agents or of the textile coating compounds.

Dressing agents and textile coating compounds (e.g. textile printing pastes) in most cases contain their own binders. The formulating agent of the pigment preparation serves to facilitate the incorporation of the pigment in the dressing agent or in the textile coating compound. The formulating agents must not deleteriously affect the properties of the dressing agents and textile coating compounds.

Aqueous systems are being increasingly used for the dressing of leather and the printing of textiles. Aqueous pigment preparations for colouring the dressing agents and textile coating compounds used are not only required to be capable of dilution with water and free from migrating components and to have a high pigment content at low viscosity, high stability and good compatibility with the other components of the dressing agents or textile coating compounds but are also required not to impair the properties of the dressing agents and textile coating compounds nor the properties of the finished articles in which these agents have been used. Thus, for example, they must not deleteriously affect the abrasion resistance, bending strength, wet adherence, ironing and embossing qualities, swelling properties and softness and hardness at different temperatures (and hence also the low temperature strength).

Aqueous pigment preparations are known, for example, from DE-OS 3 625 605 (=U.S. Pat. No. 4,812,492). The polyurethane ureas used as formulating agents may be obtained by the poly- addition of polyester diols or polyether diols and dimethylol propionic acid to diisocyanates, dispersion of the resulting polyaddition product in water, neutralisation and chain lengthening with polyamines. Although these pigment preparations fulfil many of the requirements, they are still not quite satisfactory in their levelling properties and the water resistance of coatings prepared from pigmented dressing agents and pigmented textile coating compounds.

It has surprisingly been found that oligourethanes which are obtainable from isocyanate prepolymers and amino alcohols and carry anionic (or potentially anionic) and cationic (or potentially cationic) groups in certain proportions are superior to the state of the art formulating agents. In this connection potentially ionic groups are understood to be, for example, acid groups and amino groups which are capable of forming ionic groups by neutalisation, protonation, quaternisation or betaine formation The present invention relates to the use of oligo urethanes in the molecular weight range of from 5000 to 50,000 which are free from primary and secondary amino groups and contain ethoxy groups incorporated in a quantity of from 5 to 25% by weight, based on the oligourethane, and anionic and cationic groups, the quantity of anionic groups amounting to 0.2 to 0.8 mol, preferably 0.25 to 0.7 mol per 1000 g of oligourethane and the molar ratio of anionic/cationic groups amounting to 0.8 to 4, preferably 0.9 to 3.6, as formulating agents for aqueous pigment preparations.

The molecular weights mentioned for the oligourethanes are average molecular weights and are calculated from the nature and quantity of the starting components.

The oligourethanes to be used according to the invention are preferably reaction products of I) polyisocyanates,
II) hydroxyl compounds and
III) aminoalcohols.

The organic polyisocyanates I) may be aliphatic, cycloaliphatic araliphatic, aromatic or heterocyclic polyisocyanates such as those described, for example, by W. Siefken in Liebigs Annalen der Chemie 562, pages 75 to 136.

Preferred polyisocyanates I) are compounds of the formula $Q(NCO)_n$ having an average molecular weight below 800, n denoting a number from 2 to 4 and Q denoting an aliphatic $C_2$–$C_{14}$-hydrocarbon group, a cycloaliphatic $C_6$–$C_{15}$-hydrocarbon group, an araliphatic $C_7$–$C_{15}$-hydrocarbon group or a heterocyclic $C_2$–$C_{12}$ group having 1 to 3 hetero atoms selected from oxygen, sulphur and nitrogen, for example: (i) Diisocyanates such as ethylene diisocyanate, 1,4-tetramethylene diisocyanate, 1,6-hexamethylene diisocyanate, 1,12-dodecane diisocyanate, cyclobutane-1,3 -diisocyanate cyclohexane-1,3- and -1,4-diisocyanate and any mixtures of these isomers, 1-isocyanato-2-isocyanato-methyl-cyclopentane, 1-isocyanato-3,3,5-trimethyl-5-isocyanatomethyl-cyclohexane, 2,4- and 2,6-hexahydrotolylene diisocyanate and any mixtures of these isomers, hexa- hydro-1,3- and/or-1,4-phenylene diisocyanate, perhydro-2,4'- and/or -4,4'-diphenylmethane-diisocyanate, 1,3- and 1,4-phenylene-diisocyanate, 2,4- and 2,6-tolylene- diisocyanate and any mixtures of these isomers, diphenyl- methane-2,4'- and/or -and/or -4,4'-diisocyanate, naphthalene-1,5-diisocyanate, polyisocyanates containing uretdione groups, e.g. bis-(6-isocyanatohexyl)-uretdione or the dimers of 1-isocyanato-3,3,5-trimethyl-5-isocyanatomethylcyclohexane containing the uretdione structure and any mixtures of the above-mentioned polyisocyanates; (ii) trifunctional and higher functional polysocyanates such as the isomers of the triisocyanato-triphenyl thiophosphate series and their mixtures; the isomers of the triisocyanato triphenylmethane series (such as triphenylmethane-4,4',4"-triisocyanate) and their mixtures; biurets and isocyanurates or tris-urethanes of hexamethylene diisocyanate, of isophorone diisocyanate or of other aliphatic isocyanates, and polyphenyl-polymethylene polyisocyanates as obtained by aniline/formaldehyde condensation followed by phosgenation.

The compounds for reaction with these polyisocyanates I) may be mono- and especially polyhydroxyl compounds II) having from 2 to 8, preferably 2 or 3 hydroxyl groups per molecule and an (average) molecular weight of up to 10,000, preferably up to 6000. Both low molecular weight polyhydroxyl compounds having molecular weights of from 62 to 499 and relatively high molecular weight polyhydroxyl compounds having average molecular weights of at least 500, preferably at least 1000 may be used, such as those described in detail in the above-mentioned publications.

Low molecular weight polyhydroxyl compounds II ("chain lengthening agents") include a wide variety of diols such as, for example, a) alkanediols such as ethylene glycol, propylene glycol-(1,3) and propylene glycol-(1,2), butane-diol-(1,4), pentanediol-(1,5), dimethylolpropane-diol-(1,3) and hexanediol-(1,6);

b) ether diols such as diethylene glycol, triethylene glycol and 1,4-phenylene-bis-(β-hydroxyethylether);

c) ester diols corresponding to the general formulae

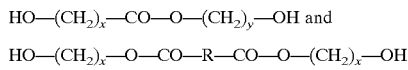

HO—(CH$_2$)$_x$—CO—O—(CH$_2$)$_y$—OH and

HO—(CH$_2$)$_x$—O—CO—R—CO—O—(CH$_2$)$_x$—OH in which
R denotes an alkylene or arylene group having 1 to 10, preferably 2 to 6, carbon atoms,
$x$=2 to 6 and
$y$=3 to 5,
e.g. δ-hydroxybutyl-ε-hydroxy-caproic acid ester, ω-hydroxyhexyl-γ-hydroxybutyric acid ester, adipic acid-(β-hydroxyethyl)ester and terephthalic acid-bis-(β-hydroxyethyl)ester.

Relatively high molecular weight polyhydroxyl compounds II include those known per se in polyurethane chemistry, such as hydroxypolyesters, hydroxypolyethers, hydroxypolythio-ethers, hydroxypolyacetals, hydroxypolycarbonates and/or hydroxypolyester amides, preferably those having average molecular weights of from 600 to 4000, most preferably those with average molecular weights of from 800 to 2500. Polyether polyols and polyester polyols are particularly preferred.

Ethylene oxide polyethers II having an average of 2 to 3 hydroxyl groups per molecule and an average molecular weight of from 250 to 2500 are particularly preferred; these may also contain polypropylene oxide units. In a particularly preferred embodiment, ethylene oxide polyethers are used in a quantity resulting in an oligourethane having 5 to 15, preferably 6 to 10% by weight of polyethoxy groups, based on the oligourethane.

The hydroxyl group-containing polyesters II may be, for example, reaction products of polyhydric, preferably dihydric alcohols, optionally together with trihydric alcohols, with polybasic, preferably dibasic carboxylic acids. Instead of using free polycarboxylic acids, the corresponding polycarboxylic acid anhydrides or corresponding polycarboxylic acid C$_1$–C$_4$-alkyl esters or mixtures thereof may be used for the preparation of the polyesters. The polycarboxylic acids may be aliphatic, cycloaliphatic, aromatic and/or heterocyclic and may be substituted, e.g. by halogen atoms, and/or unsaturated.

The following are examples of such polycarboxylic acids: Succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids such as oleic acid optionally mixed with monomeric fatty acids, terephthalic acid dimethylester and carbonic acid.

The following are examples of suitable polyhydric alcohols: Ethylene glycol, propylene glycol-(1,2) and -(1,3), butylene glycol-(1,4) and -(2,3), hexanediol-(1,6), octanediol-(1,8), neopentyl glycol, cyclohexane dimethanol (1,4-bis-hydroxymethylcyclohexane), 2-methyl- 1,3-propanediol, glycerol, trimethylolpropane, hexane-triol-(1,2,6), butanetriol-(1,2,4), trimethylolethane, pentaerythritol, quinitol, mannitol and sorbitol, methyl glycoside, diethylene glycol, triethylene glycol, tetra-ethylene glycol, dipropylene glycol, dibutylene glycol and polybutylene glycols.

Particularly preferred polyesters II contain residues of polyethylene glycols (e.g. di-, tri- and/or tetraethylene glycol) with molecular weights of from 106 to 200 incorporated in their structure. Such modified polyesters are particularly advantageous when no polyethylene glycols are used for the preparation of the oligourethanes used according to the invention. The quantity of built-in polyethylene glycol groups is preferably chosen so that the ethoxy group content of the oligourethane to be used according to the invention is from 5 to 50% by weight, preferably from 20 to 40% by weight.

The components incorporated for the introduction of ionic groups into the oligourethanes may, quite generally speaking, consist of cationic and anionic starting components of the type described for the preparation of oligourethanes, such as, for example, dihydroxyl compounds or diisocyanates containing ionic groups.

Preferred starting materials for the incorporation of anionic groups in the oligourethanes to be used according to the invention include dihydroxycarboxylic and sulphonic acids and their salts.

Preferred dihydroxycarboxylic acids have 4 to 12 carbon atoms per molecule such as, for example, dihydroxymaleic acid, dihydroxyfumaric acid, tartaric acid, 2,3-, 2,4-, 2,5-, 2,6-, 3,4- and 3,5-dihydroxybenzoic acid, 4,6-dihydroxyisophthalic acid, 2,8-dihydroxynaphthoic acid-(3) and in particular compounds corresponding to the formula

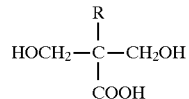

wherein R stands for C$_1$–C$_4$-alkyl, in particular methyl (dimethylolpropionic acid).

Preferred dihydroxysulphonic acids and their salts correspond to the following formula

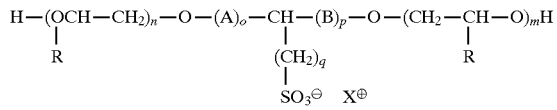

wherein
A and B denote, independently of one another, divalent aliphatic hydrocarbon groups having 1 to 6 carbon atoms,
R stands for hydrogen, an aliphatic hydrocarbon group having 1 to 4 carbon atoms or a phenyl group,
X$^⊕$ stands for an alkali metal cation or an optionally substituted ammonium group,
n and m denote, independently of one another, zero or numbers from 1 to 30,
o and p stand for zero or 1 and
q stands for zero, 1 or 2.

Such diols are described, for example, in DE-OS 2 446 440.

The most preferred sulphonate diol is the product of addition of sodium bisulphite to butene-2-diol-1,4.

The diisocyanates containing (potentially) ionic groups include, for example, modified isocyanates as described in DE-OS 1 939 911, 2 227 111, 2 359 613 and 2 359 614; for example, aromatic diisocyanates containing free sulphonic acid groups obtainable by the sulphonation of aromatic diisocyanates, in particular 2,4-diisocyanatotoluene or 4,4'-diisocyanatodiphenylmethane. Diisocyanates which react as quaternising agents with amines may also be used as compounds containing (potentially) ionic groups, e.g. chlorohexylisocyanate, m-chloromethylphenylisocyanate, 2,4-diisocyanatobenzyl chloride or isocyanates containing alkyl sulphonic acid ester groups, e.g. 4-isocyanatobenzene sulphonic acid methyl ester, since their reaction with, for example, tertiary amines also introduces cationic groups bound in homopolar form into the oligourethane.

Amino alcohols III for the synthesis of the oligourethanes to be used according to the invention include monohydric alcohols but are preferably diols or triols, in particular alkoxylated aliphatic, cycloaliphatic, aromatic and heterocyclic amines, e.g. N,N-dimethylethanolamine, N-methyldiethanolamine, N-butyldiethanolamine, N-oleyldiethanolamine, N-cyclohexyldiethanolamine, N-methyldiisopropanolamine, N-cyclohexyldiethanolamine, N-methyldiisopropanolamine, N-cyclohexyldiethanolamine, N,N-dioxyethylaniline, N,N-dioxyethyl-m-toluidine, N, N-dioxyethyl-p-toluidine, N,N-dioxypropylnaphthylamine, dioxyethylpiperazine, polyethoxylated butyldiethanolamine, polypropoxylated methyldiethanolamine (the average molecular weight being preferably from 250 to 3000 in the case of polyalkoxylated products). Amino alcohols III having at least one tertiary nitrogen atom and at least 2 hydroxyl groups per molecule are particularly preferred. Among these, aliphatic products are again preferred on account of the high light fastness required.

Cationic groups within the meaning of the claims include the groups incorporated in a homopolar form in the oligourethane but not the ammonium groups attached in heteropolar form which may be produced from the neutralisation of the potentially ionic groups.

One possible explanation of the effect according to the invention, at least within the most preferred range, namely when the starting products are used in such arithmetically equivalent ratios that the number of isocyanate groups corresponds exactly to the number of isocyanate-reactive groups, is that isocyanate groups are lost by side reactions so that a slight excess of isocyanate-reactive groups results. If the compounds used as binders for leather dressings or textile coating compounds are capable of reacting with isocyanate-reactive groups (e.g. polyisocyanates), then the oligourethanes may be chemically incorporated in the leather dressing or textile coating layers by way of the excess isocyanate reactive groups. If one assumes that from 0.1 to 0.4% of the isocyanate groups are lost in the reaction of polyisocyanates, hydroxyl compounds and amino alcohols, one may expect an excess of isocyanate reactive groups of about 25 to 100 mmol per 1000 g of oligourethane to result.

The oligourethanes to be used according to the invention may be prepared discontinuously or continuously.

The equivalent ratio of isocyanate groups to isocyanate reactive groups of all the starting components taking part in the synthesis of the polyaddition products according to the invention is generally from 0.8:1 to 1.2:1, preferably from 0.9:1 to 1:1.

The oligourethanes to be used according to the invention are generally prepared without water and in the presence or absence of organic solvents.

If an organic solvent is used, which may sometimes be indicated for reasons of viscosity, it is best to use solvents which are also suitable as dispersing agents for the preparation of the aqueous dispersions. Organic solvents of this type include water-miscible esters, ketones, ethers, amides, etc., such as methoxypropylacetate, butanone-2, dioxane, dimethylformamide, dimethylsulphoxide, etc.

The aqueous dispersions may be prepared either (i) by mixing the oligourethane with water and adjusting the aqueous dispersion to the desired pH or (ii) mixing the solution of the oligourethane in the organic solvent with water, adjusting to the required pH and if necessary partly or completely evaporating off the organic solvent.

The aqueous dispersions consisting of oligourethane and aqueous phase which may contain up to 30% by weight of organic solvent (based on the sum of water and organic solvent) generally contain oligourethane in quantities of from 10 to 80% by weight, preferably from 20 to 40% by weight, based on the sum of oligourethane, aqueous phase and organic solvent.

The aqueous pigment preparations are generally prepared from

A. 1 to 80 parts by weight of pigment and

B. 99 to 20 parts by weight of aqueous oligourethane dispersion (as described above).

Preferred pigments used for the purpose of this invention have densities of from 0.8 to 7, preferably from 1 to 6 [g/ml]. The term "density" as used herein means the density determined by the pyknometer method (ISO 787/10). The densities of pigments which are available as commercial products can be found in Lückert, Pigment+Füllstoff Tabellen, 3rd. edition, Popp Druck, Langenhagen (Germany) 1984.

Preferred pigment preparations in the sense of this invention have pigment concentrations of from 2 to 20, preferably from 6 to 18 ml pigment per 100 g of pigment preparation. The above concentration is the quotient $$\frac{\text{g pigment per 100 g pigment preperation}}{\text{pigment density}}$$

The pigment concentration in dressing agents for leather and leather imitations and in textile coating compounds are lower by a factor of about 10 in most cases.

With the aid of these oligourethane dispersions, the pigments can be easily and quickly dispersed by grinding the components, for example in a rotor-stator mill or a pearl or ball mill. The particle size of the ground pigments and the colour yield are excellent.

There is virtually no limitation to the choice of suitable pigments for the aqueous pigment preparations; they may be inorganic or organic. Suitable organic pigments include, for example, those of the azo, anthraquinone, azoporphine, thioindigo, dioxazine, naphthalene tetracarboxylic acid and perylene tetracarboxylic acid series as well as laked dyes such as calcium, magnesium or aluminum lakes of dyes containing sulphonic acid and/or carboxylic acid groups; a large number of these is known, for example, from Colour-Index, 2nd Edition. Examples of suitable inorganic pigments (or matting agents) include zinc sulphides, titanium dioxides, ultramarine, iron oxides, nickel and chromium compounds, carbon blacks, silicon dioxides and aliminum oxides.

The products may be added in known manner to the appropriate dressing preparations (e.g. based on aqueous butadiene copolymer, polyacrylate and/or polyurethane dispersions as described, for example, in Ullmanns Encyklop ädie der technischen Chemie, 4th Edition, Volume 16, Verlag Chemie, Weinheim/New York 1978, pages 159 et seq and the literature cited there) and applied to the leather by casting, spraying or printing. They may also be used in the coating of textiles for colouring aqueous acrylate and/or polyurethane dispersions, in which case they are applied to a separating paper by spread coating in known manner, usually in several layers, and then transferred from the paper to the textile. If the interlayers or the (textile) coatings are to be subsequently cross-linked by means of polyisocyanates in order to render them water resistant and increase their resistance to solvents, it is advisable to adjust the pH of the amphoteric oligourethane with alkalies, trialkylamine (e.g. trimethylamine or triethylamine), alkylalkanolamine, etc.. pH-Values of from 7 to 10, especially from 8 to 9, are particularly preferred. Textiles may also be directly coated by spread coating with polyurethanes and/or polyacrylate dispersions containing these pigment preparations to colour them. Pigment printing pastes conventionally used for textile printing and applied to the textile by screen printing may also be coloured with these pigment preparations.

The oligourethanes to be used according to the invention are free of N-methylol groups and groups produced by the reaction of such N-methylol groups with reactive groups. The pigment formulations prepared with the aid of the oligourethanes employed according to the invention and the coatings produced with these pigment formulations do not therefore exude any formaldehyde and are thus correspondingly friendly to the environment.

In the following examples the percentages relating to quantities and concentrations are in each case based on weight.

EXAMPLES

The percentages given in the following Examples are percentages by weight and the parts are parts by weight unless otherwise indicated.

The following auxiliary agents were used:

Aqueous ammonia: 25%

(R)BAYDERM Fix CI: Isocyanate-based cross-linking agent of Bayer AG (R)BAYDERM Fix PCL: Carbodiimide-based cross-linking agent of Bayer AG (R)Elftex 415: Colour black of Cabot Company, D-6450 Hanau (R)Shell-Sol TD: Isoparaffin mixture (b.p. 172°–194° C.) of Shell, D-6236 Eschborn (R)Eukanol-Paste M: an aqueous shellac/wax dispersion of Bayer AG produced with acrylate thickener (R)Baysin Glanz K: aqueous preparatin of Bayer AG based on decomposed casein (R)Euderm dispersion 92 A: 35% aqueous dispersion of an acrylate/acrylic acid copolymer, Shore A hardness 92, product of Bayer AG (R)Euderm weiβ CG: 65% aqueous dispersion of rutile pigment in acrylate polymer, product of Bayer AG (R)BAYFERROX 105 M: Iron oxide red of Bayer AG (R)BAYERTITAN RFDI: Titanium dioxide (rutile type) of Bayer AG (R)BAYDERM Soft V: Aqueous dressing agent based on wool grease of Bayer AG (R)BAYDERM Grund 10 UD: 30% aqueous dispersion of an anionic aliphatic polyurethane, Shore A hardness 10, product of Bayer AG (R)EUDERM Resin 40 B: 40% aqueous dispersion of a butadiene copolymer, Shore A hardness 40, product of Bayer AG (R)EUDERM Grund 25 A: 40% aqueous dispersion of an acrylate copolymer, Shore A hardness 25, product of Bayer AG (R)Nopco 8050: Defoamant of Münzing Company, D-7100 Heilbronn (R)EMULGATOR WN: Emulsifier of Bayer AG based on an alkoxylated aromatic compound (R)ACRACONC B: Thickener of Bayer AG based on polyacrylic acid (R)IMPRANIL DLP Dispersion: 40% aqueous dispersion of an aliphatic polyurethane, product of Bayer AG (R)EMULGATOR VA: 50% aqueous oligourethane dispersion of Bayer AG (R)ACRAMIN BA: 35% aqueous dispersion of Bayer AG of a butadiene/acrylonitrile copolymer (R)ACRAMIN Weichmacher ACN: Aqueous dispersion of Bayer AG based on a praffin/silicone oil mixture.

Examples A to D relate to state of the art formulating agents.

Example A describes the preparation of a polyetherurethane containing carboxyl groups.

Example B describes an amphoteric polyester polyurethane which is insufficiently compatible with water.

Example C describes a highly hydrophilic formulating agent with which it is not possible to prepare water-resistant coatings and dressings.

Example D describes a carboxyl group-containing polyester/polyether polyurethane which is difficult to disperse.

Example E and the following are according to the invention.

I. Preparation of the Formulating Agent

Example A 1000 g of a polypropylene glycol ether (OH number 56; 1000 mmol OH) were dehydrated with stirring (45 min., 100° C., 13 Torr) in a glass beaker equipped with stirrer. 67 g (1000 mmol OH) of dimethylolpropionic acid were then introduced and 333 g of isophorone diisocyanate (3000 mmol NCO) were added with stirring at 50° to 60° C. Stirring was continued for 4 hours at 80° C. and a sample was removed and the isocyanate content of the prepolymer obtained was titrated. The isocyanate content of the thin liquid obtained as product was 3.3% (theoretical 3.35%). 74 g of n-butanol (1000 mmol OH) were then added as chain terminator and the mixture was stirred for a further 30 minutes at 90° C. and again titrated: The product contained no more titratable NCO. 1440 g of demineralised water were added to this product with stirring, followed by 25 g of aqueous ammonia within 60 minutes. A polyurethane dispersion having a solids content of 50% was obtained. The dispersion had a pH of 7.2 and a viscosity of 200 mPa.s at 23° C. When attempts were made to produce a film from the polyurethane dispersion by applying it to a separating paper with a doctor knife and then drying, a sticky, smeary mass was obtained which did not form a film. This polyurethane was unsuitable as pigment formulating agent because it did not sufficiently disperse.

Example B 770 g of a hexanediol/neopentyl glycol/polyadipate with OH number 73 (1000 mmol OH) were reacted with 67 g of dimethylolpropionic acid (1000 mmol OH) and 333 g of isophorone diisocyanate (3000 mmol NCO) by a method analogous to that of Example A. 15 g of triethanolamine (300 mmol OH) and 55.5 g of isobutanol (750 mmol OH) were introduced into the resulting highly viscous isocyanate prepolymer (NCO content 3.52%) and the mixture was stirred for one hour at 95° C. 3600 g of water were then stirred into this product at 90° C. The pH was adjusted to 9.4 with aqueous ammonia. The milky cloudy dispersion had a viscosity of 1000 mPa.s at 23° C. A film of this dispersion was dull, sticky and not clear. The product was not suitable as formulating agent for pigments.

Example C 200 g of a polyester which was crystalline at room temperature, obtained from 146 g (1 mol) of adipic acid, 498 g (3 mol) of isophthalic acid and 566 g (4.8 mol) of hexane-1,6-diol and having an OH number of 85 were rapidly stirred together with 100 g of polyethylene glycol (molecular weight 400), 25 g of dimethylolpropionic acid and 189.4 g of N-methylpyrrolidone. 152.4 g of isophorone diisocyanate were then run in, the temperature was maintained at 75° C. for 2 hours, and 23.6 g of triethylamine were added. 700 g of demineralised water were added to the resulting resin with vigorous stirring. 9.4 g of diethylenetriamine in 58 g of water were then added and the mixture was stirred for one hour. A cloudy 35% oligourethane dispersion having a viscosity of 280 mPa.s at 23° C. and a pH of 8.8 was obtained. (This dispersion corresponds to dispersion E of U.S. Pat. No. 4 812 492).

A film produced from this dispersion was not smooth because the polyurethane dried only with considerable flow disturbances.

When this film was compared with a film according to Example G, the following differences were found when the films were placed in water:

The film from Example C dissolved completely after 5 hours in water while the film from Example G was only slightly swelled. Cross-linking of the oligourethanes with 5% of a commercial isocyanate-based cross-linking agent (BAYDERM$^{(R)}$ Fix CI) did not provide any improvement in the wet fastness of the film of Example C. The good water resistance of the film of Example E was further improved by the addition of the cross-linking agent.

Oligourethane C was therefore unsuitable for water-resistant coatings and prints and dressings.

Example D 1380 g (1800 mmol OH) of neopentyl glycol/hexanediol/ polyadipate (OH number 73) were dehydrated together with 222 g (1200 mmol OH) of octaethylene glycol and to this were added 200 g of dimethylolpropionic acid (3000 mmol OH). 685 g (6150 mmol NCO) of isophorone diisocyanate were added at 65° C. with stirring. The exothermic reaction which set in heated the reaction mixture to 120° C. The mass became difficult to stir and highly viscous after 45 minutes.

5520 g of demineralized water and 30 g of aqueous ammonia were added. The mixture resulted in a dispersion (pH 10.2; viscosity 200 mpa.s at 23° C.) within 2 hours at 80° to 90° C.

A film of this product was clear and dry but it was not very suitable as formulating agents for pigments because the colour intensity of the pigments triturated in this film was only 34% of that of the Comparison sample (Example 1 of EP-A 0 086 354).

Example E

Example D was repeated with the following modifications:

690 g (900 mmol OH) of neopentyl glycol/hexanediol polyadipate,
111 g (600 mmol OH) of octaethylene glycol,
105 g (1500 mmol OH) of dimethylolpropionic acid and
500 g (4500 mmol NCO) of isophorone diisocyanate were reacted at 100° C. to form a prepolymer having an isocyanate value of 3.81% (theoretical 3.92%). To this were added 37.5 g (750 mmol OH) of triethanolamine and 55.5 g of n-butanol (750 mmol OH). The reaction, which was again exothermic, was left to continue for 30 minutes and the reaction mixture was cooled to 110° C. 3490 g of demineralized water and 80 g of aqueous ammonia were poured into this mass with vigorous stirring. A 30% oligourethane dispersion having a pH of 8.8 and a viscosity of 350 mPa.s at 23° C. was obtained. A film cast from this clear dispersion was clear, smooth and dry.

Films were produced from the dispersion and tested as such and in the cross-linked state:

TABLE 1

To Example E

| Polyurethane from Example E | Cross-linking agent Type | Quantity based on polyurethane (solid) [%] | Tensile strength [MPa] | Elongation at break [%] | Weight increase after 24 hours' storage in water [%] |
|---|---|---|---|---|---|
| | — | — | 1.9 | 140 | 10 |
| | $^{(R)}$BAYDERM Fix CI | 3 | 1.3 | 30 | 6 |
| | $^{(R)}$BAYDERM Fix CI | 5 | 1.3 | 50 | 2 |
| | $^{(R)}$BAYDERM Fix PCL | 3 | 1.2 | 50 | — |
| | $^{(R)}$BAYDERM Fix PCL | 5 | 1.2 | 50 | — |

Example E-1

In one variation, n-butanol was replaced in the oligourethane of Example E by the equimolar quantity of isobutanol as chain terminator. A black pigment preparation prepared from this oligourethane dispersion was slightly weaker in colour than that obtained when n-butanol was used.

Example E-2

Example E was repeated with the only difference that the polyol mixture was dissolved in 665 g of methoxypropyl acetate before the isocyanate was added. The mixture was stirred for 90 minutes at 50°–60° C. after the addition of 500 g of isophorone diisocyanate and the remainder of the reactants was then added. The reaction mixture was finally dispersed in a mixture of 85 g of aqueous ammonia and 2650 g of water. The pH of this dispersion was 7.7 and the viscosity of the clear dispersion was 1,200 mPa.s at 23° C.

Example E-3

Example E was repeated except that the pH of the oligourethane dispersion was adjusted with aqueous 25% sodium hydroxide solution.

The following oligourethanes were prepared analogously to Example E:

Example P1

300 Parts of a carbon black (Elftex(R) 415), 450 parts of the polyetherurethane prepared according to Example A, 158 parts of water, 300 parts of aminoethanol and 50 parts of an aliphatic solvent (Shell-sol(R) TD) added to prevent foaming were mixed with vigorous stirring in a dissolver and the mixture was stirred for 50 minutes. It was then ground in a laboratory pearl mill (pearls 0.9 to 1.2 mm in diameter). The resulting pigment was dull when spread

TABLE 2

| No. | Polyester polyol | [g] | [mol OH] | Octaethylene glycol [g] | [mmol OH] | Dimethylolpropionic acid [g] | [mmol OH] | Polyisocanate | [g] | [mmol NCO] |
|---|---|---|---|---|---|---|---|---|---|---|
| F | Diethylene glycol polyadipate (OH number 67) | 125 | 150 | — | — | 10 | 150 | Isophorone diisocyanate | 50 | 450 |
| G | Hexanediol/neopentylglycol polyadipate (OH number 73) | 138 | 180 | 22 | 120 | 20 | 300 | 2,4-/2,6-tolylene diisocyanate | 78.3 | 900 |
| H | Hexanediolpolyadipate (OH number 64) | 158 | 180 | 22 | 120 | 20 | 300 | Isophorone diisocyanate | 100 | 900 |
| K | Hexanediol/neopentylglycol polyadipate (OH number 73) | 69 | 90 | 11.1 | 60 | 10 | 150 | Isophorone diisocyanate | 50 | 450 |

| No. | Chain terminator | [g] | [mmol OH] | Amino alcohol | [g] | [mmol OH] | $NH_3$ 25% [g] | Water [g] | pH | Viscosity [mPa · s/23° C] |
|---|---|---|---|---|---|---|---|---|---|---|
| F | Isobutanol | 5.6 | 75 | Triethanolamine | 3.7 | 75 | 20 | 431 | 9.2 | 180 |
| G | n-Butanol | 11.1 | 150 | Triethanolamine | 7.5 | 150 | 30 | 593 | 9.5 | 180 |
| H | n-Butanol | 11.1 | 150 | Triethanolamine | 7.5 | 150 | 30 | 926 | 9.1 | 100 |
| K | Hexanediol-1,6 | 4.5 | 75 | Dimethylethanolamine | 6.7 | 75 | 7 | 346 | 8.7 | 200 |

Examples of Practical Application:

Pigment preparation

The colour intensity of the pigment was tested as follows:
150 Parts of Eukanol(R)-Paste M
100 parts of Baysin(R) Glanz K
300 parts of Euderm(R)-Dispersion 92A were thoroughly mixed with
350 parts of water.

10 Parts of the pigment preparation were introduced into 90 parts of this mixture (in the case of black pigments: 1 part of pigment preparation was stirred into 99 parts of Mixture 1). This coloured mixture was applied to glossy paper (or to paper with zebra stripes printed thereon if the pigment preparation was to be tested for its covering power) in a layer thickness of 100 μm at the same time as the comparison trituration, and the layer was then dried at 80° C. The covering power was determined by comparison.

To determine the colour intensity of the pigment, 10 parts of Euderm(R) weiss CG were stirred into 90 parts of the above mixture. 5 Parts of the pigment trituration were stirred into 20 parts of this white mixture, applied by coating knife to form a layer 150 μm in thickness and dried. The colour intensity of the pigment was determined by the intensity with which it was capable of colouring this white mixture.

coated over a surface and about 20% weaker than a comparable pigment according to Example 2 of DE-OS 32 03 817.

Example P2

Example P1 was repeated with the polyester polyurethane of Example B. The difficulty occurred in this case that the binder was only soluble in a strongly alkaline medium (pH>9.4). It was nevertheless used for forming in black pigment (analogously to Example P1). After it had been applied by doctor knife from a standard mixture, the pigment was dull, sticky and matt and therefore unsuitable.

Example P3

The binder of Example C was used analogously to Example P1:

450 g of oligourethane C (35% in water) were ground in a dissolver for 40 minutes with 300 g of Elftex(R) 415, 145 g of water, 15 g of ethanolamine and 50 g of (R)Shell-sol TD and then ground for 50 minutes in a pearl mill. The viscosity of the pigment mixture which was at pH 10.4 was 500 mPa.s at 23° C. The intensity of the colour was 15% less than that of pigment preparation P6. Films prepared from this dispersion were highly sensitive to water and therefore unsuitable.

Example P4

It was hardly possible to prepare a pigment trituration with the binder of Example D analogously to Example P1;

the colour intensity was only 34% of that of the comparison according to Example 2 of DE-OS 3 203 817.

Example P5 (according to the invention)

The oligourethane of Example E was formulated with the following pigments as shown in Table 3:

TABLE 3 to Example P 5

| No. | Type of Pigment | Quantity of oligo-urethane E [g] | Thickener [g] | Water [g] | Amino ethanol [g] | Operating time Dissolver [min] | Bead mill [min] | Viscosity [mPa · s/23° C.] |
|---|---|---|---|---|---|---|---|---|
| P 5.1 | Pigment Yellow 81 | 180 | 430 | 11 | 310 | 10 | 40 | 20 | 1,200 |
| P 5.2 | Pigment Blue 15 | 150 | 420 | 13 | 355 | 10 | 40 | 50 | 1,500 |
| P 5.3 | Pigment Black 6 | 200 | 430 | — | 273 | 20 | 40 | 60 | 400 |
| P 5.4 | BAYFERROX(R) 105 M | 500 | 230 | 4 | 210 | 5 | 40 | 20 | 2,100 |
| P 5.5 | BAYERTITAN(R) RFDI | 650 | 180 | 20 | 131 | 5 | 40 | — | 2,700 |

Pigments formulated with the oligourethanes to be used according to the invention were distinctly superior in intensity of colour, stability of the mixture in storage and application properties to analogously formed pigments in which acrylate polymers had been used as binder (EP-A 0 086 354).

The use of other oligourethanes is described in Table 4:

TABLE 4

Examples of practical application P 6–P 10

| No. | Formulating agents according to Example | Elftex(R) 415 [g] | Water [g] | 2-Amino-ethanol [g] | Shell sol(R) TD [g] | Dissolver [min] | Bead mill [min] | Viscosity [mPa · s/23° C.] |
|---|---|---|---|---|---|---|---|---|
| P 6 | G | 450 | 300 | 130 | 20 | 50 | 40 | 60 | 1,000 |
| P 7 | H | 540 | 300 | 40 | 25 | 50 | 40 | 60 | 500 |
| P 8 | F | 450 | 300 | 130 | 33 | 55 | 40 | 60 | 60,000 |
| P 9 | K | 450 | 300 | 145 | 15 | 50 | 35 | 55 | 700 |

Examples of use

Example V1: Pigmentation of an aqueous, unreactive binder 150 g of a pigment preparation P5 were stirred together with 50 g of a softening antistick agent (BAYDERM(R) Soft U) in 500 g of water. 100 Parts of a polyurethane dispersion (BAYDERM(R) Grund 10 UD), 150 g of a butadiene copolymer binder (EUDERM(R) Resin 40 B) and 50 g of a soft acrylate copolymer (EUDERM Grund(R) 25 A) were added thereto. This primer mixture had excellent covering power and gave rise to dressings with very good wet fastness properties.

Example V2: Pigmentation of an aqueous dispersion of a cross-linkable butadiene copolymer A process for the dressing of leather in which NBR (butadiene/acrylonitrile/styrene/methacrylic acid copolymer) latices are cross-linked with the aid of divalent metal hydroxides is described in DE-OS 2 946 435. 100 g of a commercial pigment paste based on casein used in Example 1 of this Patent Specification were replaced by 100 g of paste P5. The leather obtained was more completely covered, more elegant in appearance and less sticky than that of Example 1 of DE-OS-2 946 435.

Example V3: Pigmentation of an aqueous dispersion of a cross-linkable polyurethane for a textile coating After the addition of 10 g of 10% acetic acid and 1 g of a defoamant (Nopco(R) 8050) to 1000 g of a 40% aqueous dispersion of an aliphatic, cross-linkable polyesterurethane prepared according to DE-OS-2 814 173, Example 2, 100 g of the titanium dioxide pigment preparation P 5.5 followed by 20 g of a 50% aqueous solution of a partially etherified melamine-formaldehyde precondensate were added with stirring, using a slow grid stirrer. 17 g of a copolymer of vinyl pyrrolidine and vinyl acetate were then added in an evacuation stirrer to adjust the viscosity for spread coating.

After 5 minutes+ stirring, a finely divided, stable pigment dispersion suitable for coating textiles by the reversal process or the direct process was obtained. The paste was at pH 6 and had a viscosity of 4300 mPa.s at 23° C. The polyurethane films prepared with the pigment dispersion by known processes were uniformly coloured and free from patches. Cross-linking was carried out under heat treatment of the coated and dried goods for 90 seconds at 150° C. after application of the last coat.

Pigmentation of Textile Printing Pastes

Example V4

10 g of urea were dispersed in 760 g of water together with 1.0 g of emulsifier ((R)EMULGATOR WN), 20 g of thickener ((R)ACRACONC B), 200 g of a 40% dispersion of polyurethane in water ((R)IMPRANIL DLP dispersion) and 80 g of the black pigment preparation P 5.3 to form a paste. This paste was printed on a cotton fabric.

Example V4A

In a comparison experiment, the 80 g of pigment preparation P 5.3 in paste V4 were replaced by 80 g of a commercial aqueous carbon black preparation containing a dispersing agent based on an aryl polyalkylene ether (e.g. ethylene oxide polyether started on nonyl phenol). Both the printing paste of Example V4 and that of Example V4A could easily be removed from the sieve and the application roller by means of water. Both printing pastes were fixed by heating to 150° C. (5 min).

The print produced with paste V4 showed distinctly less damage after it had been washed and brushed with a nylon brush than the print obtained with paste V4A.

Example V4A 10 g of urea, 2 g of emulsifier ($^{(R)}$EMULGATOR VA), 25 g of thickener ($^{(R)}$ACRACONC B), 200 g of a 35% aqueous dispersion of an acrylonitrile/butadiene copolymer ($^{(R)}$ACRAMIN BA) and 10 g of plasticizer ($^{(R)}$ACRAMIN Weichmacher ACN) were mixed together in 753 g of water. 80 g of the black pigment preparation P 5.3 were added to 920 g of this printing paste which was then used for printing and fixed for 5 minutes at 150° C.

Example V5A 80 g of commercial aqueous carbon black preparation containing a dispersing agent based on an aryl polyalkylene ether were added to 920 g of the printing paste from Example V5 and the paste was printed and fixed for 5 minutes at 150° C.

A comparison of the fastness properties of prints V5 and V5A showed that the wet fastnesses (wet abrasion, washing with brushing) of print V5 were substantially better than those of print V5A.

Example V6

When Examples V4 and V5 were repeated with pigment preparations P 5.1, P 5.2, P 5.4, P 5.5 and P 6, P 7 and P 8, the wet fastness properties obtained were in all cases substantially superior to those obtained with conventional pigment preparations.

What we claim is:

1. An aqueous pigment preparation comprising
   (a) a formulating agent comprising an oligourethane having a number average molecular weight range of from 5000 to 50,000 and containing
      (1) no primary or secondary amino groups,
      (2) 5 to 25% by weight, based on the oligourethane, of incorporated ethoxy groups, and
      (3) anionic and cationic groups, wherein the quantity of anionic groups is from 0.2 to 0.8 mol per 1000 g of the oligourethane and the molar ratio of anionic to cationic groups is from 0.8 to 4,
   wherein said oligourethane comprises a reaction product of a polyisocyanate, hydroxyl compounds, wherein at least one such hydroxyl compound is a dihydroxyl compound containing ionic groups; and an amino alcohol having tertiary nitrogen atoms;
   (b) from 2 to 20 ml, per 100 gram of pigment preparation, of a pigment having a density of from 0.8 to 7 g/ml; and
   (c) an aqueous phase containing up to 30% by weight of organic solvent.

2. An aqueous pigment preparation according to claim 1 wherein the dihydroxyl compound containing ionic groups comprises a dihydroxysulfonic acid corresponding to the formula

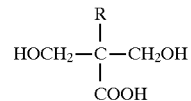

wherein R is $C_1$–$C_4$ alkyl.

3. An aqueous pigment preparation according to claim 1 wherein the dihydroxyl compound containing ionic groups comprises a dihydroxysulfonic acid corresponding to the formula

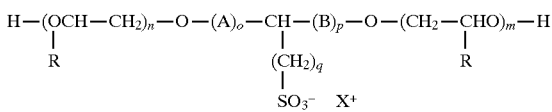

wherein
   A and B are, independently of one another, divalent aliphatic hydrocarbon groups having 1 to 6 carbon atoms,
   R is hydrogen, an aliphatic hydrocarbon groups having 1 to 4 carbon atoms, or a phenyl group,
   $X^+$ is an alkali metal cation or an optionally substituted ammonium group,
   n and m are independently zero or numbers from 1 to 30,
   o and p are independently zero or 1, and
   q is zero, 1, or 2.

4. An aqueous pigment preparation according to claim 1 wherein the formulating agent contains 0.25 to 0.7 mol of anionic groups per 1000 g of the oligourethane.

5. An aqueous pigment preparation according to claim 1 wherein the molar ratio of anionic to cationic groups in the formulating agent is from 0.9 to 3.6.

6. A process for coloring a dressing agent for leather or a coating composition for textiles comprising mixing an aqueous pigment preparation according to claim 1 with said dressing agent for leather or coating composition for textiles.

* * * * *